April 15, 1969 J. F. INGLE 3,439,229

PULSE DRIVEN CIRCUIT FOR ACTIVATING AN ELECTROMAGNETIC DEVICE

Filed Dec. 28, 1966

INVENTOR
J. F. INGLE
BY Daniel D. Dubosky
ATTORNEY

United States Patent Office 3,439,229

Patented Apr. 15, 1969

3,439,229

PULSE DRIVEN CIRCUIT FOR ACTIVATING AN ELECTROMAGNETIC DEVICE

James F. Ingle, Fair Haven, N.J., assignor to Bell Telephone Laboratories, Incorporated, Murray Hill, N.J., a corporation of New York Filed Dec. 28, 1966, Ser. No. 605,402
Int. Cl. H01h 47/22, 47/32
U.S. Cl. 317—148.5 6 Claims

ABSTRACT OF THE DISCLOSURE

A circuit for energizing an electromagnetic device utilizing a single transistor. A pulse source, which also provides an extraneous D.C. residual voltage, is connected through a diode to the base electrode of the transistor, and is also connected to the emitter electrode through a low pass filter to provide the emitter electrode with a potential equal to the D.C. residual voltage of the pulse source. Hence, the base-emitter junction of the transistor is forward biased only by the voltage pulse and not by the extraneous D.C. residual voltage.

Figure 1:
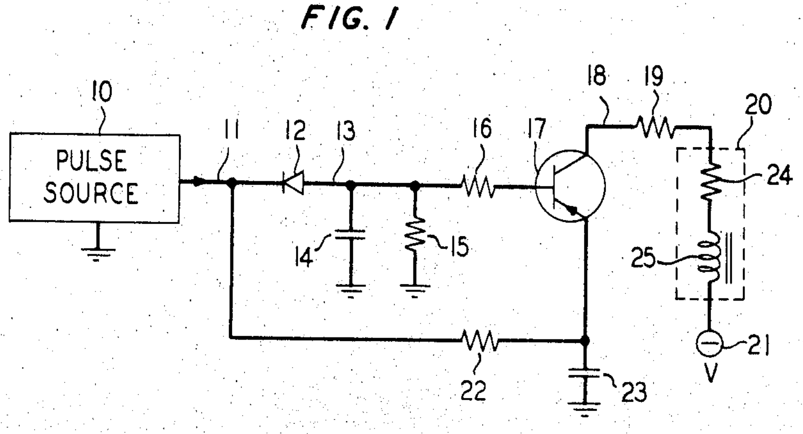

This invention relates to transistor circuits for activating electromagnetic devices from a pulse source whose output energy during the pulse interval is insufficient to directly activate the electromagnetic device.

It is frequently desirable in transmission measuring sets to activate an electromagnetic device, such as a relay, upon the appearance of a voltage pulse of short duration. In common practice the output of a source of pulses is applied to a transistor circuit which serves to drive the relay in the desired manner. Typical sources of such voltage pulses unfortunately produce a D.C. residual output in addition to the desired pulses.

For example, in commonly employed unijunction transistor relaxation oscillators of the type shown in FIGURE 13.21, page 13, of the "Transistor Manual," seventh edition, 1964, by the General Electric Company, the unijunction transistor, like other semiconductor devices, presents a finite internal impedance to the flow of current even when the device is not in its conduction state. As a result of this finite impedance, the output of a unijunction transistor relaxation oscillator during intervals other than the pulse interval is never exactly zero volts even where the resistance across which the pulse is developed has one end connected to reference potential as in circuit (A) of the above-identified FIGURE 13.21. Accordingly, a small but finite extraneous D.C. residual voltage appears at the output of pulse sources including such oscillators at times between voltage pulses. Furthermore, variations in the internal impedance from one unijunction transistor to another causes this residual D.C. voltage to be totally unpredictable from one pulse generating circuit to another. In practice the range of D.C. residual voltage levels obtained has been in excess of one volt. Care must be taken in coupling the voltage pulse to a transistor circuit which is used to activate an electromagnetic device so that the extraneous D.C. residual voltage will not also activate the transistor circuit. In addition, it is desirable to have no necessary factory or field adjustments to compensate for the differences which are obtained in the D.C. residual voltage among pulse generators in different transmission measuring sets.

One solution to the above-mentioned extraneous D.C. residual voltage problem which has been used in the prior art is to couple the output of the pulse generator to the transistor which activates the electromagnetic device through an isolation or coupling capacitor. This capacitor, however, must have low leakage resistance, and high quality capacitors of this type are expensive. Another solution has been to bias the transistor by means of a varistor or Zener diode so that even the maximum D.C. residual level which can be expected will not trigger the transistor activating circuit. With the latter approach to the problem however, in systems having generator circuits with a low D.C. residual level some of the pulse will be clipped and therefore not all of the pulse energy will be available for use in driving the transistor activating circuit. One could, of course, use the clipped pulse to drive a monostable multivibrator, but the latter circuit needs at least two transistors and the many components attendant therewith. Transformer coupling is still another possible theoretical solution, but in addition to having a tendency to saturate with D.C. current flow produced by the D.C. residual voltage, a transformer is expensive.

Accordingly, one object of the present invention is to directly couple a pulse generator having an extraneous D.C. residual voltage at its output to a transistor circuit which activates an electromagnetic device.

Another object is to use no more than one transistor in the circuit which activates the electromagnetic device.

Still another object is to utilize the full energy present in the voltage pulses from any pulse generator which is used to drive the transistor activating circuit even though differences may exist in the extraneous D.C. residual voltage from one generator to another.

These and other objects are achieved in accordance with the present invention wherein the short interval voltage pulse from a pulse generator having an extraneous D.C. residual voltage at its output is coupled through a diode to a capacitor discharge means connected to the base of a single transistor. Deposit of the voltage pulse on the capacitor discharge means causes the transistor to go into and remain in conduction for a sufficient interval so as to activate an electromagnetic device connected between the collector of the transistor and a potential source. The emitter of the transistor is stably biased to the extraneous D.C. residual voltage level by a low pass filter connected between the output of the generator and the emitter electrode. As a result, the relay is activated only by the voltage pulse and the full energy of the pulse is available to activate the relay even though differences may exist in the D.C. residual voltage among pulse generators used to drive the circuit.

Figure 2:
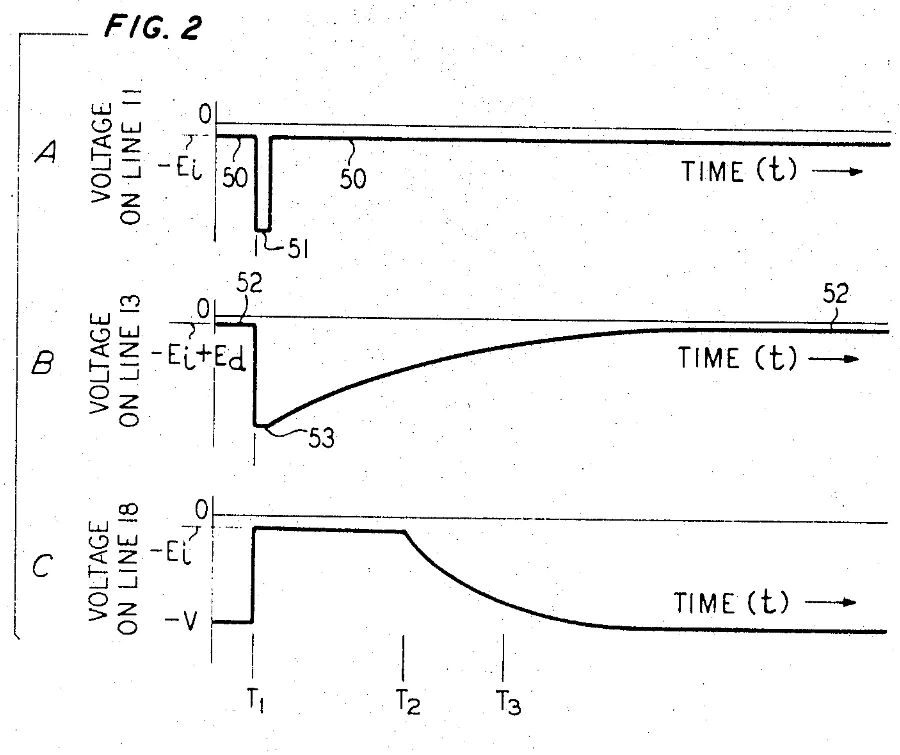

The features and attendant advantages of the instant invention will be better understood after a consideration of the following detailed description in combination with the accompanying drawings in which:

FIG. 1 is a schematic diagram of a circuit constructed in accordance with the present invention; and FIG. 2 is a presentation of voltage wave forms useful in the explanation of the operation of the circuit shown in FIG. 1.

In FIG. 1, a pulse source 10 at predetermined intervals develops a voltage pulse on line 11 as shown at 51 in voltage waveform A of FIG. 2 at time $(t)=T_1$. In addition to producing the voltage pulse 51 at $t=T_1$, the output of pulse source 10 on line 11 also contains an extraneous D.C. residual voltage level of $-E_1$ volts, as shown at 50 in waveform A of FIG. 2, during times other than during the pulse interval. As indicated hereinabove, pulse source 10 can be a unijunction transistor relaxation oscillator of the type shown in FIG. 13.21 (A) of the above-identified "Transistor Manual" or any other pulse source which produces an extraneous D.C. residual voltage between the desired pulse intervals.

Line 11 from pulse source 10 is connected to one end of a resistance 22, the other end of which is connected to the emitter of a transistor 17 and one plate of a high valued capacitor 23. The other plate of capacitor 23 is connected to a reference potential which may be ground as shown in FIG. 1. The low pass filtering action of resistance 22 and capacitor 23 causes the potential on the emitter of transistor 17 to remain substantially constant and equal to the exraneous D.C. residual voltage on line 11 throughout the operation of the circuit even during the pulse intervals. In a specific circuit which was constructed to operate from a pulse source which provided a voltage pulse having a width of 0.2 millisecond, a value of 20K ohms for resistance 22 and a value of 100 microfarads for capacitor 23 was found to provide the desired low pass filtering action.

In addition, line 11 is connected to the cathode of a diode 12, the anode of which is connected by way of line 13 to one plate of a capacitor 14, one end of a resistance 15, and one end of a resistance 16. The other plate of capacitor 14 and the other end of resistnace 15 are connected to reference potential whereas the other end of resistance 16 is connected to the base of transistor 17. The collector of transistor 17 is connected via line 18 through a resistance 19 to one side of a mercury relay 20, whose electrical characteristics may be represented by a resistance 24 and an inductance 25. The other end of relay 20 is connected to a potential source 21, indicated in FIG. 1 as providing a source of $-V$ volts.

The operation of the circiut shown in FIG. 1 can best be described by referring to the voltage waveforms in FIG. 2 in connection with the following discussion of what happens in the circuit at the specific instants indicated on the abscissa of the voltage waveforms. At times preceeding the voltage pulse 51 at $T_1$, i.e. at $t<T_1$, the D.C. residual voltage 50 of $-E_i$ volts on line 11 is coupled through resistance 22 to the emitter of transistor 17. The voltage on line 13 at $t<T_1$ shown as voltage level 52 in waveform B of FIG. 2, is equal to $(-E_i+E_d)$ volts, a value more positive than the voltage on line 11 by the voltage drop $(E_d)$ across forward biased diode 12 brought about by the current which flows from reference potential through high valued resistance 15, and through diode 12 to line 11. This potential on line 13 is also coupled through resistance 16 to the base of transistor 17, and since it is more positive than the potential on the emitter of transistor 17, the base-emitter junction of the latter is back-biased and the transistor is not in conduction. Consequently, only the collector cutoff current of $I_{co}$ will flow through relay 20 and resistance 19 and this current is insufficient to operate relay 20. Since $I_{co}$ is very small, the potential on line 18 is substantially equal to $-V$ volts, the potential from minus potential source 21, as indicated in waveform C of FIG. 2 at $t<T_1$.

At $t=T_1$, voltage pulse 51 from pulse source 10 occurs on line 11 as indicated in waveform A of FIG. 2. Due to the low pass filtering action of resistance 22 and high valued capacitor 23, voltage pulse 51 on line 11 does not produce any perceptible change in the potential applied to the emitter of transistor 17, and therefore the potential on this electrode remains at a value substantially equal to $-E_i$ volts. Voltage pulse 51 is, however, coupled through diode 12 to line 13 thereby charging capacitor 14 to voltage level 53 as indicated at $t=T_1$ in waveform B of FIG. 2. This increase in negative potential to level 53 on line 13 at $t=T_1$ is coupled through resistance 16 to the base of transistor 17, thereby forward biasing the base-emitter junction of transistor 17, placing the latter in conduction and causing the potential on line 18 to rapidly drop toward zero to about $-E_i$ volts as indicated at $t=T_1$ in waveform C of FIG. 2. With transistor 17 in conduction, current is permitted to flow from capacitor 23, through transistor 17 via line 18 through resistance 19 and relay 20 to the minus potential source 21. This current through the relay is sufficient to activate relay 20. In fact, resistance 19 is advantageously connected in series iwth relay 20 solely for the purpose of limiting the amount of current flow through the relay during the conduction period of transistor 17.

Immediately after the termination of voltage pulse 51 from pulse source 10, the potential on line 11 returns to the D.C. residual voltage level 50. This drop in negative potential on line 11 causes diode 12 to be back-biased, and the potential across capacitor 14, that is on line 13 as shown in waveform B of FIG. 2, begins to fall toward the potential $-E_i$ across capacitor 23. Since high valued resistance 15 is about an order of magnitude higher in value than resistance 16, most of the discharge of capacitor 14 occurs through resistance 16 and the base-emitter junction of transistor 17. The potential on line 18 during the interval after $t=T_1$ but before $t=T_2$ remains substantially constant, increased only slightly in a negative direction by the fact that current is flowing out of high valued capacitor 23.

At $t=T_2$, capacitor 14 has discharged to the point where the base-emitter junction is no longer sufficiently forward biased to maintain transistor 17 in a state of conduction. Accordingly, the discharge of capacitor 14 continues, but the impedance between the collector and emitter of transistor 17 becomes increasingly significant and the potential on line 18 begins to increase negatively toward minus potential source 21 as indicated in waveform C of FIG. 2. At $t=T_3$, the impedance presented by transistor 17 to current flow on line 18 has increased to the point where the current through relay 20 is no longer sufficient to maintain the relay in its activated state. After $t=T_3$, the circuit returns to the conditions which existed and were described hereinabove for $t<T_1$.

What has been described hereinabove is a specific illustrative embodiment of the principles of the present invention. Numerous modifications may be made by those skilled in the art without departing from the spirit and scope of the present invention. For example, the D.C. residual voltage and voltage pulse may be positive in which case diode 12 would be poled in the opposite direction, an NPN rather than the PNP transistor shown would be utilized, and a positive potential source would be utilized in place of source 21.

What is claimed is:

1. A circuit for activating an electromagnetic device in response to a voltage pulse which is provided by a pulse source which also provides an extraneous D.C. residual voltage, said circuit comprising a transistor having a base, emitter, and collector electrode, means connecting the electromagnetic device between said collector electrode and a potential source, diode means for coupling the voltage pulse to said base electrode, and a low pass filtering means connected between said pulse source and said emitter electrode for providing the latter with a substantially constant potential equal to the D.C. residual voltage, whereby the base-emitter junction of said transistor is forward biased only by the voltage pulse and not by the extraneous D.C. residual voltage.

2. A circuit as defined in claim 1 wherein said low pass filtering means includes a resistor connected between said pulse source and said emitter electrode and a capacitor connected between said emitter electrode and a reference potential.

3. A circuit as defined in claim 1 wherein said diode means includes a capacitor means for storing a charge in response to said voltage pulse, said capacitor being discharged through said base-emitter junction for an interval longer than the voltage pulse width.

4. A circuit for activating an electromagnetic device in response to a voltage pulse from a pulse source which also provides an extraneous D.C. residual voltage, said circuit comprising a transistor having base, emitter and collector electrodes, means connecting the electromagnetic device between said collector electrode and a potential source, a capacitor having one plate connected to a reference potential and the other plate connected through a resistance means to said base electrode, a diode for charging said capacitor by coupling the voltage pulse from said pulse source to the other plate of said capacitor, the discharge of said capacitor through said resistance means and the base-emitter junction of said transistor causing said electromagnetic device to be activated, and a low pass filtering means connected between said pulse source and said emitter electrode for providing the latter with a substantially constant potential equal to the D.C. residual voltage, whereby the base-emitter junction of said transistor is forward biased only by the voltage pulse and not by the extraneous D.C. residual voltage.

5. A circuit as defined in claim 4 wherein said low pass filtering means includes a capacitor connected between said emitter electrode and said reference potential, and a resistor connected between said pulse source and the junction of said emitter electrode and said high valued capacitor.

6. A circuit for activating an electromagnetic device in response to a short interval voltage pulse of a predetermined polarity at its input, said circuit comprising a transistor having base, emitter and collector electrodes, a diode having one electrode connected to the input and the other electrode connected through a resistance means to said base electrode, said diode being poled so as to permit the base-emitter junction of said transistor to be forward biased by the voltage pulse at said input, means for connecting the electromagnetic device between said collector electrode and a potential source, a capacitor having one plate connected to the junction of said diode and said resistance means and the other plate connected to a reference potential, said capacitor being charged through said diode by said voltage pulse and discharged through said resistance means and said base-emitter junction, a second resistance means connected between said input and said emitter-electrode, and a high valued capacitor connected between said emitter electrode and a reference potential for stabilizing the potential on said emitter electrode to whatever D.C. voltage level exists at the input, whereby said base-emitter junction is forward biased by the voltage pulse but not by the D.C. voltage at said input.

References Cited

UNITED STATES PATENTS

| | | | |
|---|---|---|---|
| 2,864,975 | 12/1958 | Sumner | 317—148.5 XR |
| 3,067,364 | 12/1962 | Rosso | 317—148.5 |
| 3,122,651 | 2/1964 | Hawkins et al. | 307—253 |
| 3,130,327 | 4/1964 | Vrossa et al. | 307—253 |
| 3,204,153 | 8/1965 | Tygart | 317—148.5 |
| 3,243,666 | 3/1966 | Lisle | 317—148.5 XR |

JOHN F. COUCH, *Primary Examiner.*

WILLIAM SHOOP, *Assistant Examiner.*

U.S. Cl. X.R.

307—240, 253